United States Patent
Parker et al.

(10) Patent No.: US 11,767,123 B2
(45) Date of Patent: Sep. 26, 2023

(54) MOUNT TO SAFELY SECURE A CUTTER OF AN AUTOMATIC ACTIVATION DEVICE

(71) Applicant: Sun Path Products, Inc., Raeford, NC (US)

(72) Inventors: Thomas Parker, Raeford, NC (US); Jesse Sparling, Raeford, NC (US); Justin Beaurivage, Victoriaville (CA)

(73) Assignee: SUN PATH PRODUCTS, INC., Raeford, NC (US)

( * ) Notice: Subject to any disclaimer, the term of this patent is extended or adjusted under 35 U.S.C. 154(b) by 306 days.

(21) Appl. No.: 17/315,849

(22) Filed: May 10, 2021

(65) Prior Publication Data
US 2022/0355940 A1 Nov. 10, 2022

(51) Int. Cl.
*B64D 17/62* (2006.01)
*B64D 17/52* (2006.01)

(52) U.S. Cl.
CPC ............. *B64D 17/62* (2013.01); *B64D 17/52* (2013.01)

(58) Field of Classification Search
CPC ................................ B64D 17/56; B64D 17/00
See application file for complete search history.

(56) References Cited

U.S. PATENT DOCUMENTS 3,348,793 A 10/1967 Kriesel et al.
4,715,563 A * 12/1987 Quamen .............. B64D 17/343
 244/152
6,378,808 B1 * 4/2002 Smolders ................ B64C 27/33
 244/149
7,523,890 B1 4/2009 Heflin et al.

FOREIGN PATENT DOCUMENTS

SK 500282020 * 8/2020
SK 500282020 U1 3/2021

OTHER PUBLICATIONS

Chutingstar, "AADs: Which One to Buy?", Retrieved from the Internet: URL: https://www.chutingstar.com/blog/aads-which-one-to-buy/ [Retrieved on May 10, 2021], Feb. 17, 2016, pp. 1-4.
Chutingstar, "Cypres 2 AAD", Retrieved from the Internet: URL: https://www.chutingstar.com/cypres-2 [Retrieved on May 10, 2021], pp. 1-5.
Sun Path Products, Inc., "Floor Plate for Mounting a Cutter of an Activation Device", Jan. 1, 2020, pp. 1-3.

* cited by examiner

*Primary Examiner* — Justin M Benedik
(74) *Attorney, Agent, or Firm* — COATS & BENNETT, PLLC (57) ABSTRACT

Systems and methods to cut a closing loop to deploy a parachute. The system includes a cutter with a body with a cutter opening that extends through the body and a blade that is movable across the cutter opening. Processing circuitry is configured to signal the cutter to move the blade across the cutter opening. A mount includes a base, a retainer with a channel sized to receive the cutter, and a mount opening that extends through the mount and across the channel. The cutter is configured to fit within the channel with the cutter opening aligned with the mount opening to form a through-opening such that the closing loop extends through the cutter and the mount.

19 Claims, 9 Drawing Sheets

MOUNT TO SAFELY SECURE A CUTTER OF AN AUTOMATIC ACTIVATION DEVICE

BACKGROUND

Basic skydiving equipment includes both a main parachute and a reserve parachute. The parachutes are positioned in one or more containers that are worn by the skydiver. In the event of an emergency in which the main parachute does not deploy or fails to adequately stop the fall, the reserve parachute is deployed to ensure a safe landing.

An automatic activation device (AAD) can be used to deploy the parachute. The AAD is normally used to deploy a reserve parachute but can be used to also deploy the main parachute. The AAD is configured to open the container and deploy the parachute at a preset altitude if the descent rate exceeds a predetermined speed.

Figure 1:
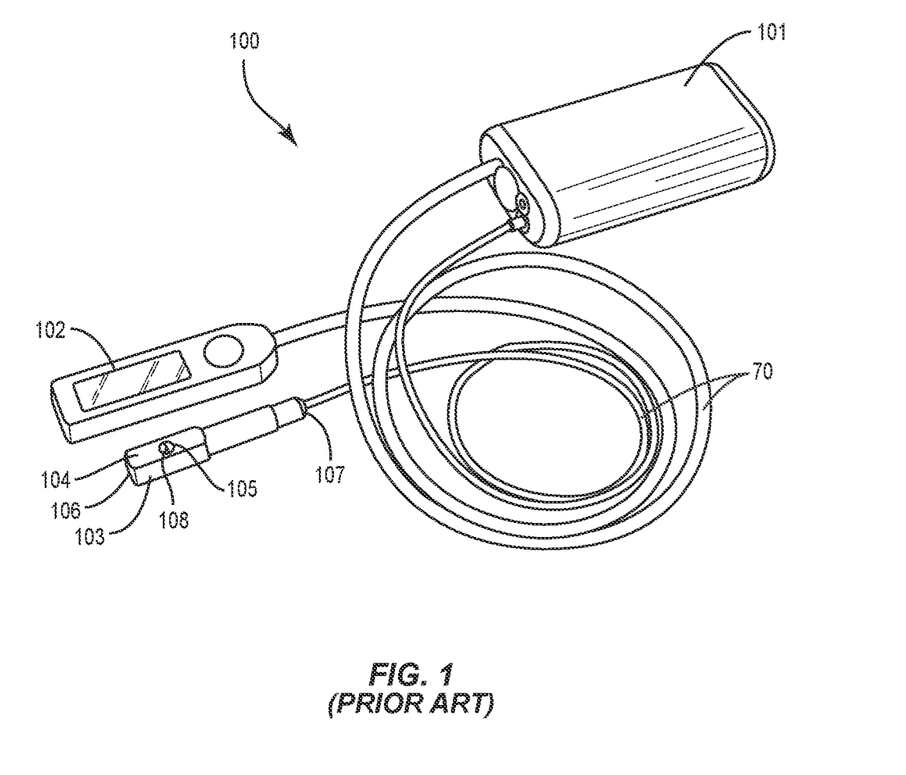
FIG. 1 is a perspective view of a prior art automatic activation device.

FIG. 1 illustrates an AAD 100 that includes a computer 101, a control unit 102 to activate and monitor the jump, and a cutter 103. The cutter 103 includes a body 104 that has an elongated shape that extends between a first end 106 and a second end 107. A blade 108 is positioned within the body 104. An opening 105 extends through the body 104 in proximity to the first end 106. The cutter 103 receives a signal from the computer 101 to move the blade 108 within the body 104 and cut a closing loop that holds the parachute in its container thus deploying the parachute.

An issue with current designs is that a user preparing the parachute may wrap the closing loop around the cutter body. This can include the user threading the closing loop through the cutter and wrapping the closing loop around the cutter body as well as just wrapping the closing loop around the cutter body (without threading through the cutter). When this occurs, the closing loop may remain attached to the cutter body thus preventing the container from opening and the parachute deploying.

A system is needed that prevents the closing loop from being incorrectly attached to the cutter. This provides for the closing loop to release thus opening the container and allowing for the parachute to deploy.

SUMMARY

One aspect is directed to a system to cut a closing loop to deploy a parachute. The system comprises a cutter with a body with a cutter opening that extends through the body and a blade that is movable across the cutter opening. Processing circuitry is configured to signal the cutter to move the blade across the cutter opening. A mount comprises a retainer with a channel sized to receive the cutter, and a mount opening that extends through the mount and across the channel. The cutter is configured to fit within the channel with the cutter opening aligned with the mount opening to form a through-opening such that the closing loop extends through the cutter and the mount.

In another aspect, the retainer comprises an enlarged base that extends outward beyond at least one side of the retainer.

In another aspect, the retainer is continuous with the base without a gap positioned between the retainer and the base.

In another aspect, the base and the retainer comprise a single, unitary construction.

In another aspect, the base and the retainer are molded together without a gap positioned between the base and the retainer.

In another aspect, the base has a greater width and a greater length than the retainer.

In another aspect, the retainer comprises an open first end that is in communication with the interior retainer and a closed second end.

In another aspect, the open first end of the retainer is aligned with an outer edge of the base.

One aspect is directed to a system to cut a closing loop to deploy a parachute. The system comprises an automatic activation device comprising a computer with processing circuitry, a control unit, and a cutter with a body having a cutter opening and a blade positioned in the body. A mount is configured to position the cutter and comprises a base and a retainer that extends from the base and comprises an enclosed channel that extends along a first axis of the retainer and a retainer opening aligned along a second axis that extends across the first axis. The retainer is sized to receive the cutter with the cutter opening aligned with the second axis when the cutter is positioned in the retainer to form a through-opening for the line to extend through the cutter and the mount.

In another aspect, the retainer abuts against the base without gaps positioned between the retainer and the base.

In another aspect, the retainer comprises a first open end that leads into the enclosed channel and an opposing closed second end.

In another aspect, the mount comprises a single, unitary construction.

In another aspect, the retainer opening comprises first and second openings through the mount on opposing sides of the channel with each of the first and second openings aligned along the second axis.

In another aspect, the first axis is perpendicular to the second axis.

In another aspect, the retainer is positioned on a first side of the base and an opposing second side of the base is flat.

One aspect is directed to a method of rigging a system to deploy a parachute that is secured within a container by a closing line. The method comprises: inserting a cutter into a retainer of a mount; aligning a cutter opening that extends through the cutter with an opening in the mount; and threading the closing loop through the cutter opening and the opening in the mount such that a first portion of the closing loop and the container are positioned on a first side of the mount and a second portion of the closing loop is positioned on an opposing second side of the mount.

In another aspect, the method further comprises completely inserting a body of the cutter into the retainer.

In another aspect, the method further comprises securing the second portion of the closing loop on the second side of the mount and preventing the closing loop from being pulled out of the cutter opening.

In another aspect, the method further comprises preventing the closing loop from wrapping around an exterior of the retainer.

In another aspect, the method further comprises frictionally securing the cutter in the retainer and preventing the cutter from rotating within the retainer.

The various aspects of the various embodiments may be used alone or in any combination, as is desired.

DETAILED DESCRIPTION

Figure 2:
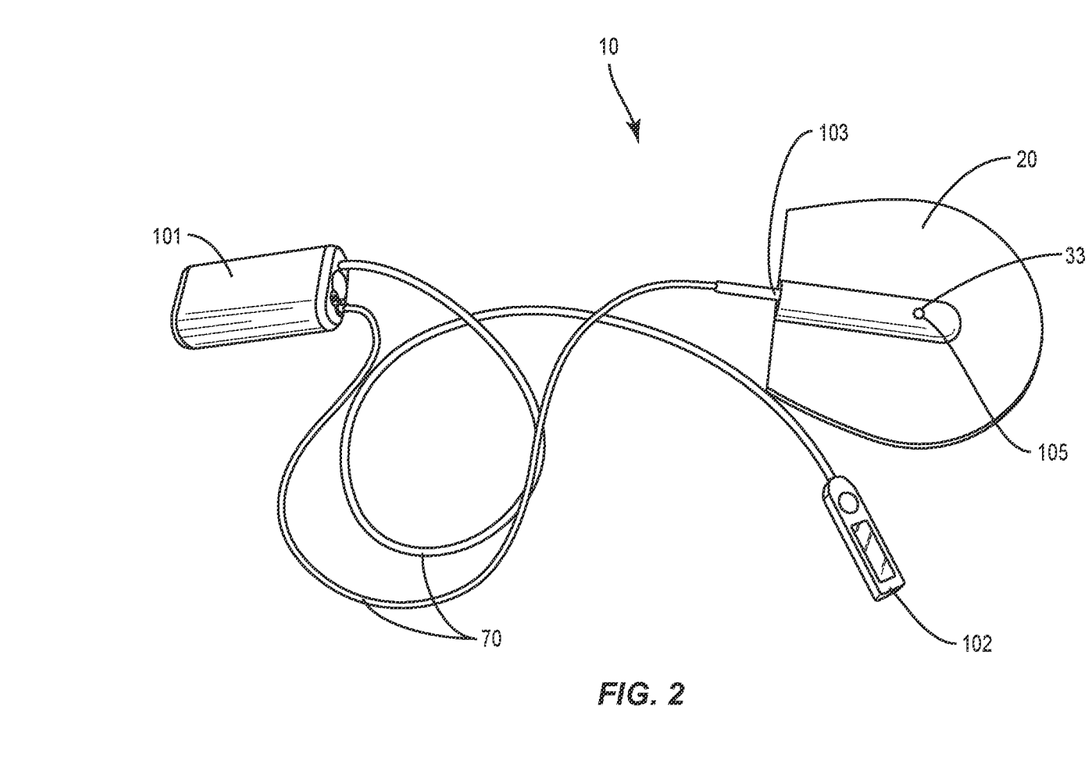
FIG. 2 is a perspective view of an optimization system that includes a mount that houses a cutter.

The present application is directed to a system to cut a closing loop that maintains a parachute container in a closed position. As illustrated in FIG. 2, the system 10 includes a mount 20, a cutter 103 sized to be inserted into the mount 20, a control unit 102, and a computer 101. The mount 20 includes an opening 33 that aligns with the opening 105 in the cutter. The aligned openings 33, 105 receive a closing loop of a container that contains the parachute. Cutting the closing loop allows for the container to open and for the parachute to deploy.

Figure 3:
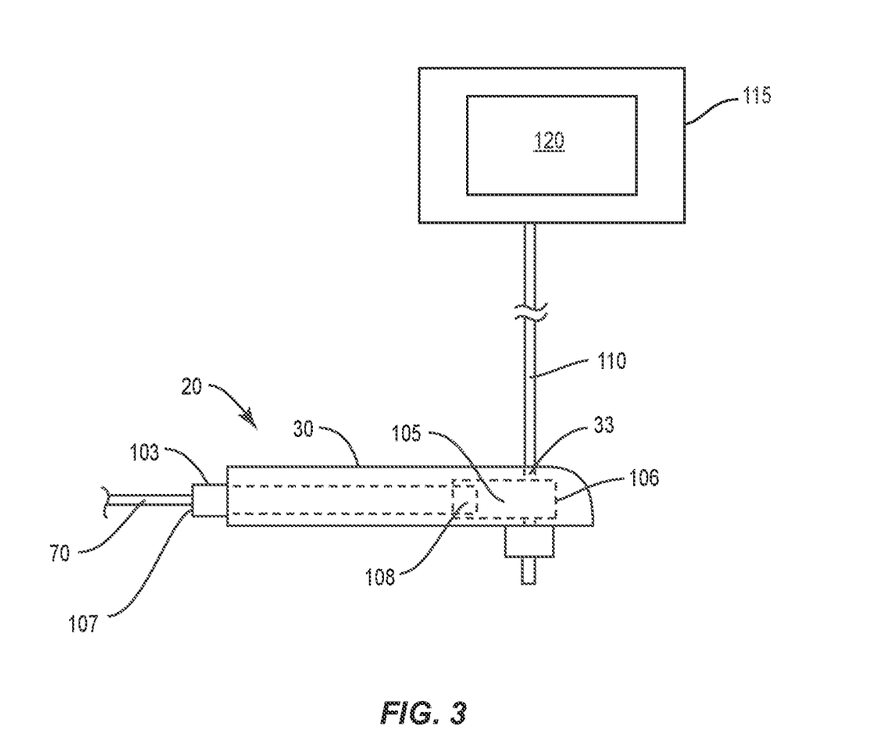
FIG. 3 is a schematic diagram of a closing loop of a parachute extending through aligned openings of a cutter that is positioned in a retainer of a mount.

FIG. 3 schematically illustrates the cutter 103 inserted into a retainer 30 of the mount 20. The cutter 103 is positioned in the retainer 30 with the opening 105 of the cutter 103 aligned with the opening 33 in the mount 20. A closing loop 110 extends through the aligned openings 33, 105. The closing loop 110 is secured to prevent being pulled back through the openings 33, 105 to maintain a container 115 that holds a parachute 120 in a closed position. Activation of the cutter 103 moves a blade 108 and cuts the closing loop 110 thus providing for the container 115 to open and to allow the parachute 120 to deploy.

The mount 20 includes the retainer 30 with an opening 33 that receives the closing loop 110. In one example, the mount 20 also includes a base that is attached to the retainer 30. In another example as illustrated in FIG. 3, the retainer 30 does not include a base.

FIGS. 4-7 illustrate an example of a mount 20 that holds the cutter 103. The mount 20 includes a base 21 and retainer 30. The base 21 includes a first side 24 on which the retainer 30 is positioned, and an opposing second side 25. The first and second sides 24, 25 are substantially flat. The base 21 has an enlarged shape with a length L that extends between a first end 26 and a second end 27, and a width W that extends between opposing lateral sides 28, 29. The base 21 can include a variety of different shapes. In one example as illustrated, the first end 26 is straight which facilitates positioning the mount 20 at a desired location relative to the container 115.

The retainer 30 is positioned on the first side 24 of the base 21. The retainer 30 includes a first end 31 and an opposing second end 32. In one example as illustrated, the retainer 30 includes a smaller length than the base 21. The second end 32 is positioned inward from the second end 27 of the base 21. Further, the second end 32 includes a rounded shape. These features prevent the closing loop 110 from being wrapped on the retainer 30 which could prevent the container 115 from opening when the cutter 103 is activated.

The retainer 30 includes an interior channel 34 sized to receive and position the cutter 103. The first end 31 of the channel 34 is open to provide for insertion of the cutter 103. The second end 32 of the channel 34 is closed to prevent over-insertion of the cutter 103 into the retainer 30. The second end 32 also provides for aligning the opening 105 in the cutter 103 with the opening 33 in the retainer 30. In one example, a distance between the second end 32 of the channel 34 and the opening 33 is equal to a distance on the cutter between the first end 106 and the cutter opening 105.

Figure 4:
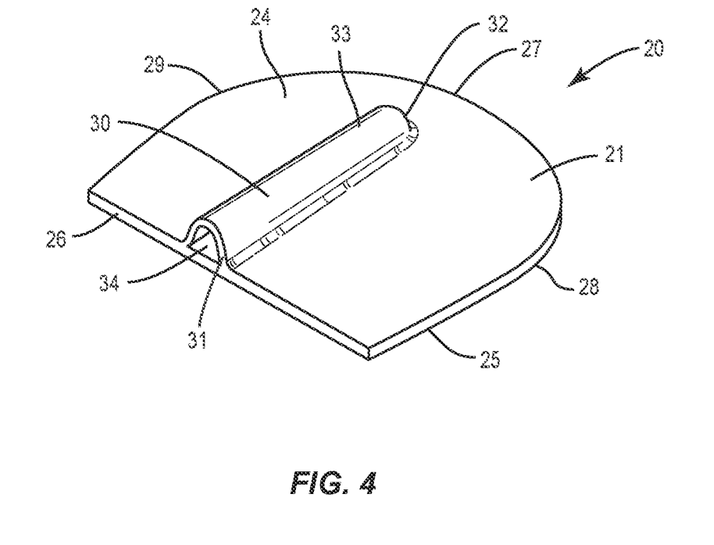
FIG. 4 is a perspective view of a mount.
Figure 5:
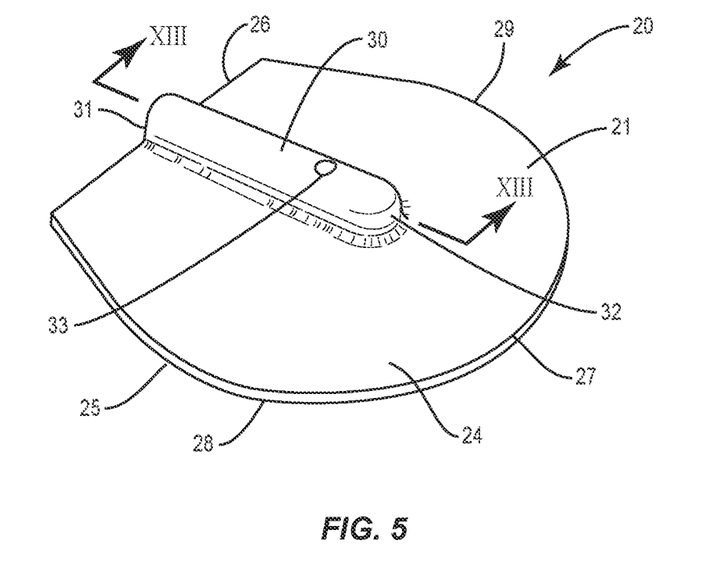
FIG. 5 is a perspective view of a mount.
Figure 6:
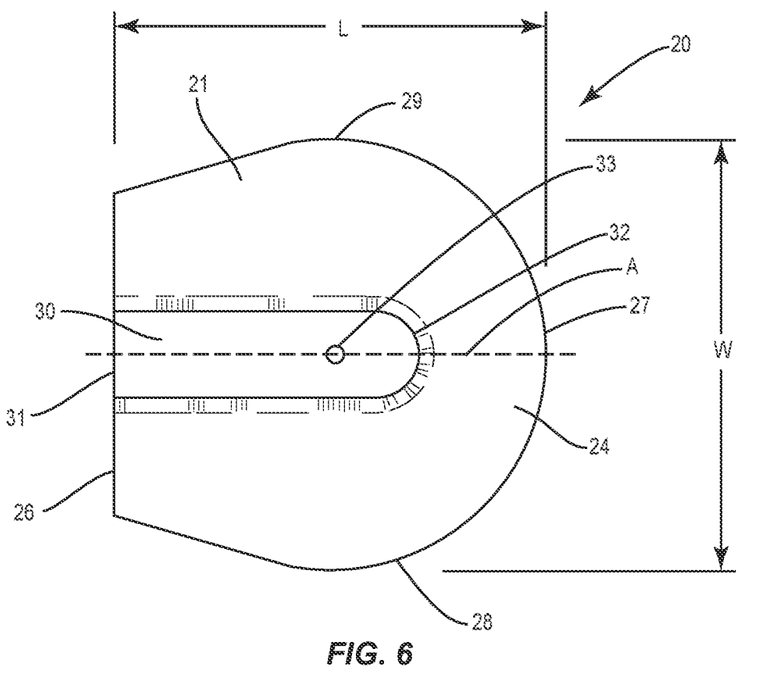
FIG. 6 is a top view of a mount.
Figure 7:
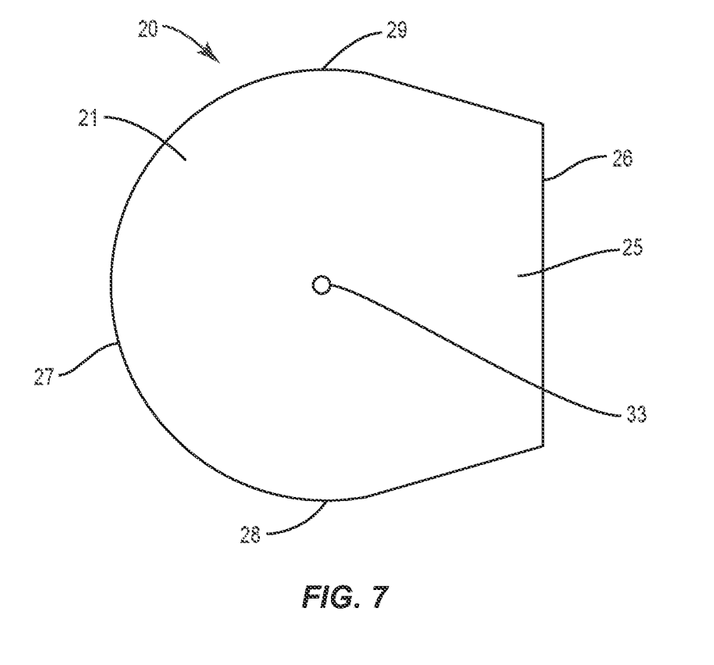
FIG. 7 is a bottom view of a mount.

In one example as illustrated in FIGS. 4-6, the first end 31 of the channel 34 is aligned with the first side 24 of the base 21. In another example, the first end 31 of the channel 34 is positioned inward from the first end 31. In another example, the retainer 30 extends outward beyond the base 21 and the first end 31 is positioned outward from the first side 24 of the base 21.

The channel 34 is sized to receive the cutter 103. In one example, the channel 34 is sized for the cutter 103 to be inserted into the first end 31 and moved along the length of the retainer 30 to align the opening 105 of the cutter with the opening 33 of the retainer 30. The relative sizes of the channel 34 and the cutter 103 provide for a friction fit to prevent inadvertent movement of the cutter relative to the retainer 30 after insertion and placement. This relative sizing provides for opening 105 of the cutter 103 to remain aligned with the opening 33 of the retainer 30.

Figure 8:
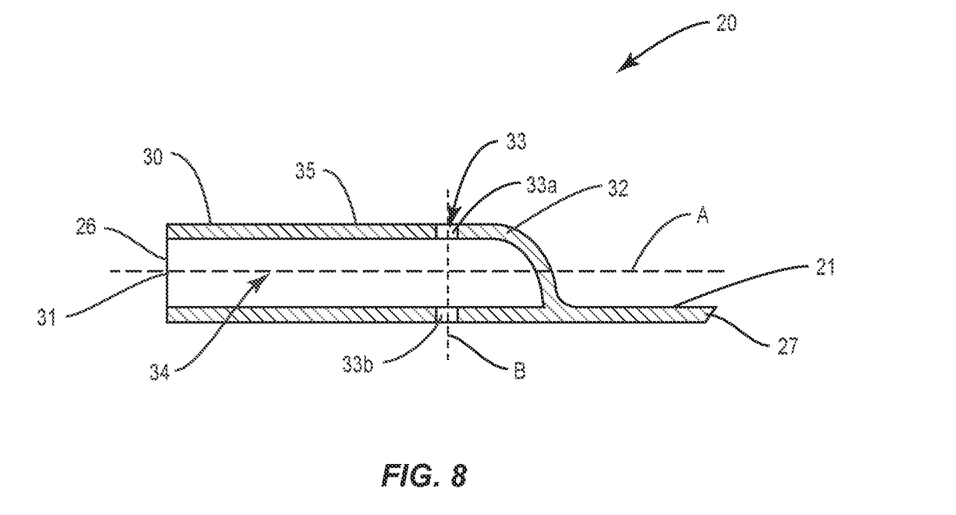
FIG. 8 is a section view of a mount taken along line XIII-XIII of FIG. 5.

FIG. 8 illustrates a section view of the channel 34 that extends through the retainer 30. The channel 34 includes the first end 31 that is open and the second end 32 that is closed. The channel 34 includes a first axis A that extends the length between the first and second ends 31, 32. The opening 33 extends through the retainer 30 and base 21. The opening 33 is formed by a first opening 33a in a wall 35 of the retainer 30 and a second opening 33b in the base 21. The openings 33a, 33b are aligned on opposing sides of the channel 34. The opening 33 includes a second axis B that is aligned transverse to the first axis A. In one example, the second axis B is perpendicular to the first axis A. In another example, the second axis B is non-perpendicular.

In one example, the channel 34 is enclosed within the mount 20. In one example, the retainer 30 includes a wall that extends completely around the channel 34. In another example as illustrated in FIG. 8, the channel 34 is enclosed by the wall 35 of the retainer 30 and the base 21. In one example as illustrated in FIGS. 4-8; the only opening in the channel 34 along the length is opening 33 with a remainder of the channel 34 being completely enclosed. In another example, one or more windows are formed in the mount 20 along the length of the channel 34 and are in communication with the channel 34.

The retainer 30 is mounted to the base 21 in a continuous manner such that there is no gap between the retainer 30 and the base 21. The lack of a gap prevents a user from positioning the closing loop 110 underneath the retainer 30 and away from the cutter 103. This forces the user to thread the closing loop 110 through the aligned openings 33, 105 to allow the cutter 103 to cut the closing loop 110 when activated.

The retainer 30 is fixedly positioned on the base 21. In one example, the base 21 and retainer 30 have a single, unitary construction. In one example, the mount is formed of a molded material with the base 21 and retainer 30 formed as a single continuous piece with a unitary construction. In another example, the base 21 is formed by a separate plate 21 that is embedded within an outer material that also forms the retainer 30. In another example, the base 21 and retainer 30 are separate members that are attached together with one or more mechanical fasteners such as but not limited to screws, bolts, and rivets. In another example, the separate base 21 and retainer 30 are attached together with adhesive. In the various examples, the retainer 30 is positioned on the base 21 without an intermediate gap.

As illustrated in FIGS. 4-6, the second end 32 of the retainer 32 includes a rounded shape. The transition between the retainer 30 and the base 21 can also have a rounded shape along the length of the retainer 30. These rounded shapes help to prevent the closing loop 110 from being secured to the retainer 30 in a manner that bypasses the opening 33. The rounded shapes provide no place for the closing loop 110 to be secured to the retainer 30 in a manner that would keep the container 115 in a closed position.

Figure 9:
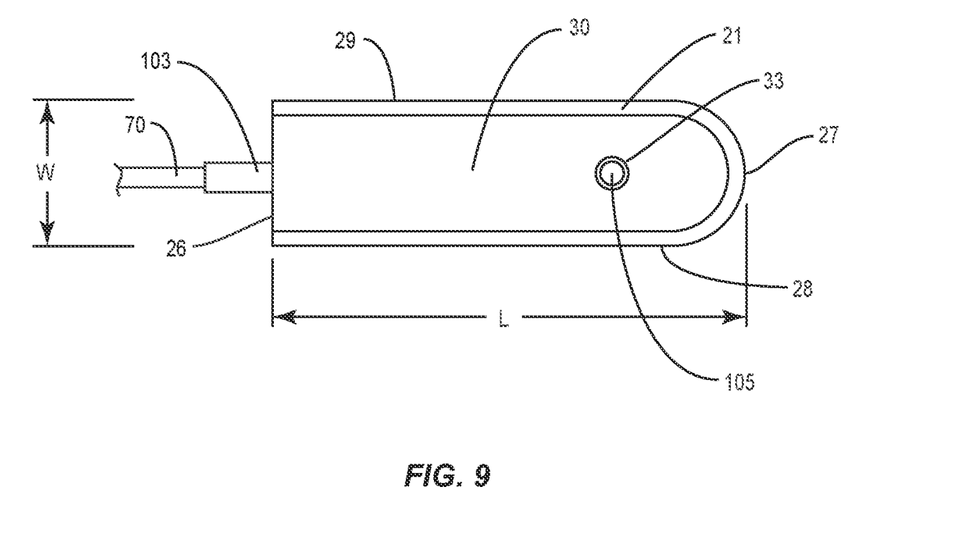
FIG. 9 is a top view of a mount with a cutter positioned within a retainer.

The size of the base 21 relative to the retainer 30 can vary. In one example as illustrated in FIGS. 4-7, the base 21 has a greater length L and a greater width W. FIG. 9 illustrates another example in which the base 21 and the retainer 30 are closer in size with the width W and length L of the base 21 each being slightly larger than the dimensions of the retainer 30. In another example, one or both of lengths and widths of the base 21 and retainer 30 are equal. The larger base 21 prevent or reduces the likelihood that the closing loop 115 can be wrapped around the mount 20 to bypass the opening 33 and cutter 103.

Figure 10:
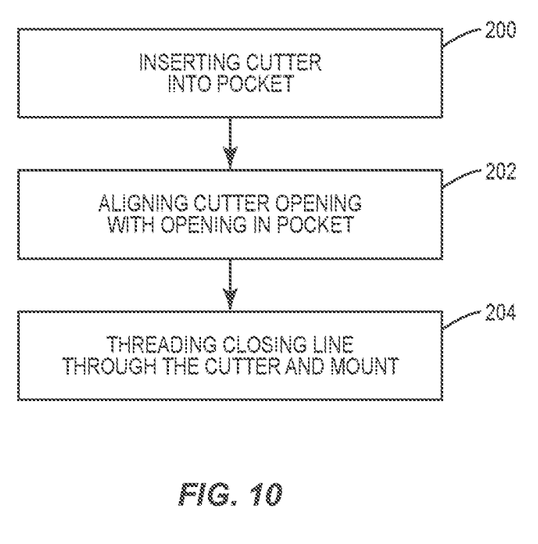
FIG. 10 is a flowchart diagram of a method of using an optimizing system for deploying a parachute.

FIG. 10 illustrates an example of a method of rigging the system 10 for cutting the closing loop 110. The cutter 103 is inserted into the retainer 30 in the mount 20 (block 200). In one example, this includes inserting the leading end 106 into the first end 31 of the channel 34 and then inserting the cutter 103 farther into the channel 34. In one example, this includes applying a force to the trailing end 107 of the cutter 103 and forcing the cutter 103 into and along the channel 34.

The method includes aligning the cutter opening 105 that extends through the cutter 103 with an opening 33 in the retainer 30 (block 202). Once the openings 33, 105 are aligned, the method includes threading a closing loop 110 through the cutter opening 105 and the opening 33 of the retainer 30 (block 204). The closing loop 110 extends through the aligned openings 33, 105 with a portion of the closing loop 110 that extends from the container 115 on a first side of the mount 20 and a second portion of the closing loop 110 positioned on an opposing second side of the mount 20. The second portion is secured to prevent the closing loop 110 from being inadvertently pulled out of the opening 105. In one example, the second portion is knotted and/or tied to a member to be larger than the opening 105 to prevent inadvertently being pulled through the opening 105.

In one example, the trailing end 107 of the cutter 103 remains extended outward beyond the first end 31 of the channel 34. In another example, the cutter 103 is fully inserted into the channel 34 with the trailing end 107 of the cutter 103 inward from the first end 31.

In one example, the control unit 102 and the cutter 103 are communicatively connected to the computer 101 by cables 70. In another example, one or both of the control unit 102 and the cutter 103 are wirelessly connected to the computer 101.

Figure 11:
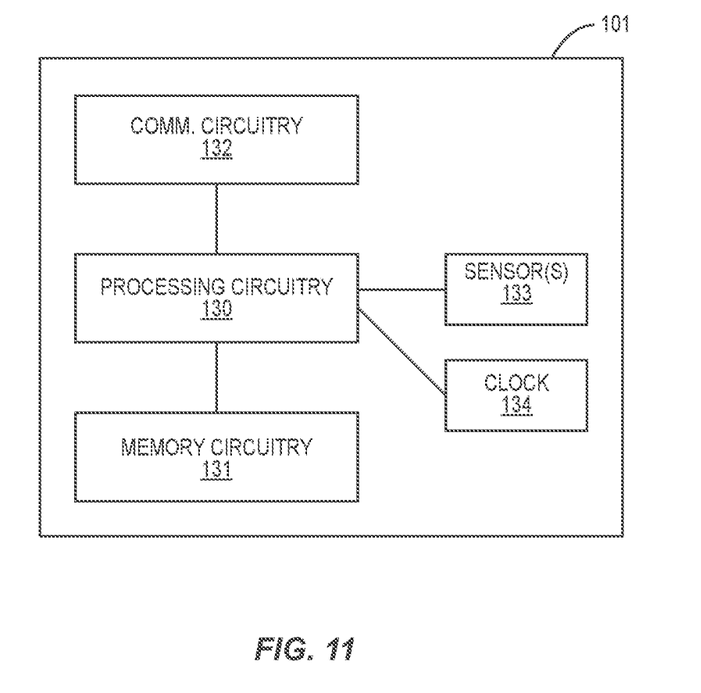
FIG. 11 is a schematic diagram of a computer.

FIG. 11 illustrates a computer 101 that is used with the AAD. The computer 101 includes control circuitry 130 and memory circuit 131. The control circuitry 130 controls the overall operation according to program instructions stored in the memory circuitry 131. The control circuitry 130 can include one or more circuits, microcontrollers, microprocessors, hardware, or a combination thereof. Memory circuitry 131 includes a non-transitory computer readable storage medium storing program instructions, such as a computer program product, that configures the control circuitry 130 to implement one or more of the techniques discussed herein.

Memory circuitry 131 can include various memory devices such as, for example, read-only memory, and flash memory.

Communications circuitry 132 provides for communications with the control unit 102 and cutter 103. The communications circuit 132 can include one or more interfaces that provide for different methods of communication. In one example, the communications circuitry 132 provides for wired communications. In another example, communications circuitry 132 provide for wireless communications.

One or more sensors 133 detect environmental aspects. One example of a sensor 133 is an air pressure sensor that detects the pressure of the air during a jump. Another sensor 133 can detect a velocity. Another example includes an orientation sensor. The computer 101 can also include a clock 134.

In one example, the computer 101 is configured to activate the cutter 103 at a preset altitude if the descent rate exceeds a preset speed. In another example, the computer 101 is configured to activate the cutter is the descent rate exceeds a preset speed after a preset time.

The mount 20 can be used with a variety of different AADs 100. Examples include but are not limited to Model No, $m^2$ available from MarS a.s., Model No, CYPRES2 available from Airtec GmbH & Co. KG Safety Systems, and Model No. Vigil from AAD nv/sa. Advanced Aerospace Designs.

In one example, the AAD 100 include both a control unit 102 and a cutter 103. In another example, the AAD 100 includes just the cutter 103.

In one example, the control unit 103 includes processing circuitry, memory circuitry, and communication circuitry. The control unit 103 is configured to communication with the computer 101 and receive inputs from a user through an input device (e.g., an input key). The control unit 103 further includes a display to display information to the user.

The mount 20 can be used with a cutter 103 for cutting a closing loop 110 that secures a container 115 that holds a main parachute 120. The mount 20 can also be used with a cutter 103 for cutting a closing loop 110 that secures a container 115 that holds a reserve parachute 120.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A system to cut a closing loop to deploy a parachute, the system comprising:

a cutter comprising a body with a cutter opening that extends through the body and a blade that is movable across the cutter opening; and processing circuitry configured to signal the cutter to move the blade across the cutter opening;

a mount comprising:
  a retainer with a channel sized to receive the cutter;
  a mount opening that extends through the mount and across the channel;
  the cutter configured to fit completely within the channel with the cutter opening aligned with the mount opening to form a through-opening such that the closing loop extends through the cutter and the mount.

2. The system of claim 1, wherein the retainer comprises an enlarged base that extends outward beyond at least one side of the retainer.

3. The system of claim 2, wherein the retainer is continuous with the base without a gap positioned between the retainer and the base.

4. The system of claim 2, wherein the base and the retainer comprise a single, unitary construction.

5. The system of claim 4, wherein the base and the retainer are molded together without a gap positioned between the base and the retainer.

6. The system of claim 2, wherein the base has a greater width and a greater length than the retainer.

7. The system of claim 1, wherein the retainer comprises an open first end that is in communication with an interior of the retainer and a closed second end.

8. The system of claim 7, wherein the mount comprises an enlarged base that extends outward beyond the retainer and the open first end of the retainer is aligned with an outer edge of the base.

9. A system to cut a closing loop to deploy a parachute, the system comprising:
  an automatic activation device comprising a computer with processing circuitry, a control unit, and a cutter with a body having a cutter opening and a blade positioned in the body, the body comprising a body length; and
  a mount configured to position the cutter and comprising:
    a base;
    a retainer that extends from the base and comprises an enclosed channel that extends along a first axis of the retainer and a retainer opening aligned along a second axis that extends across the first axis, the channel comprising a channel length;
  the channel length being greater than the body length and with the retainer sized to receive the cutter with the body fully inserted into the channel with the cutter opening aligned with the second axis when the cutter is positioned in the retainer to form a through-opening for the closing loop to extend through the cutter and the mount.

10. The system of claim 9, wherein the retainer abuts against the base without gaps positioned between the retainer and the base.

11. The system of claim 9, wherein the retainer comprises a first open end that leads into the enclosed channel and an opposing closed second end.

12. The system of claim 9, wherein the mount comprises a single, unitary construction.

13. The system of claim 9, wherein the retainer opening comprises first and second openings through the mount on opposing sides of the channel with each of the first and second openings aligned along the second axis.

14. The system of claim 9, wherein the first axis is perpendicular to the second axis.

15. The system of claim 9, wherein the retainer is positioned on a first side of the base and an opposing second side of the base is flat.

16. A method of rigging a system to deploy a parachute that Is secured within a container by a closing loop, the method comprising:
  inserting a cutter into a retainer of a mount;
  aligning a cutter opening that extends through the cutter with an opening in the mount;
  threading the closing loop through the cutter opening and the opening in the mount such that a first portion of the closing loop and the container are positioned on a first side of the mount and a second portion of the closing loop is positioned on an opposing second side of the mount; and
  securing the second portion of the closing loop on the second side of the mount and preventing the closing loop from being pulled out of the cutter opening.

17. The method of claim 16, further comprising completely inserting a body of the cutter into the retainer.

18. The method of claim 16, further comprising preventing the closing loop from wrapping around an exterior of the retainer.

19. The method of claim 16, further comprising frictionally securing the cutter in the retainer and preventing the cutter from rotating within the retainer.

* * * * *